(12) United States Patent
Salisbury

(10) Patent No.: US 9,052,775 B1
(45) Date of Patent: Jun. 9, 2015

(54) OPTICAL BASED TACTILE SHEAR AND NORMAL LOAD SENSOR

(75) Inventor: Curt Michael Salisbury, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 412 days.

(21) Appl. No.: 13/556,393

(22) Filed: Jul. 24, 2012

(51) Int. Cl.
  *G01L 1/24* (2006.01)
  *G01L 3/00* (2006.01)
  *G06F 3/042* (2006.01)

(52) U.S. Cl.
  CPC .............. *G06F 3/042* (2013.01); *G06F 3/0421* (2013.01); *G01L 1/241* (2013.01); *G01L 1/24* (2013.01)

(58) Field of Classification Search
  None
  See application file for complete search history.

(56) References Cited

U.S. PATENT DOCUMENTS

| | | | |
|---|---|---|---|
| 7,657,128 B2 | 2/2010 | Silverbrook et al. | |
| 8,749,522 B2 * | 6/2014 | Dietzel et al. | 345/175 |
| 2003/0173708 A1 * | 9/2003 | Paritsky et al. | 264/272.16 |
| 2010/0154565 A1 | 6/2010 | Wiens et al. | |
| 2012/0050735 A1 | 3/2012 | Higgins et al. | |

OTHER PUBLICATIONS

Ulmen, et al., "A Robust, Low-Cost and Low-Noise Artificial Skin for Human-Friendly Robots", Retrieved at <<http://bdml.stanford.edu/twiki/pub/HSR/HumanSafePublications/Ulmen_ICRA10.pdf>>, IEEE/RSJ International Conference on Intelligent Robots and Systems, 2010, pp. 4836-4841.

Ohmura, et al., "Conformable and Scalable Tactile Sensor Skin for Curved Surfaces", Retrieved at <<http://bdml.stanford.edu/twiki/pub/Haptics/TactileChapterReferences/Ohmura-ICRA06.pdf>>, Proceedings of the 2006 IEEE International Conference on Robotics and Automation, May 2006, pp. 1348-1353.

Dollar, et al., "Embedded Sensors for Biomimetic Robotics via Shape Deposition Manufacturing", Retrieved at <<http://www.eng.yale.edu/adollar/dollar_biorob2006.pdf>>, 2006 IEEE/RAS-EMBS International Conference on Biomedical Robotics and Biomechatronics (BioRob), Feb. 20-22, 2006, pp. 1-6.

Rowe, et al., "Simulation of a Sensor Array for Multi-Parameter Measurements at the Prosthetic Limb Interface", Retrieved at <<http://www.ee.washington.edu/research/seal/pubfiles/2004493500.pdf>>, PIE 9th Annual International Symposium on NDE for Health Monitoring and Diagnostics, vol. 5394, 2004, pp. 493-500.

(Continued)

*Primary Examiner* — Lisa Caputo
*Assistant Examiner* — Brandi N Hopkins
(74) *Attorney, Agent, or Firm* — Daniels J. Jenkins

(57) ABSTRACT

Various technologies described herein pertain to a tactile sensor that senses normal load and/or shear load. The tactile sensor includes a first layer and an optically transparent layer bonded together. At least a portion of the first layer is made of optically reflective material. The optically transparent layer is made of resilient material (e.g., clear silicone rubber). The tactile sensor includes light emitter/light detector pair(s), which respectively detect either normal load or shear load. Light emitter(s) emit light that traverses through the optically transparent layer and reflects off optically reflective material of the first layer, and light detector(s) detect and measure intensity of reflected light. When a normal load is applied, the optically transparent layer compresses, causing a change in reflected light intensity. When shear load is applied, a boundary between optically reflective material and optically absorptive material is laterally displaced, causing a change in reflected light intensity.

4 Claims, 8 Drawing Sheets

(56) References Cited

OTHER PUBLICATIONS

Valdastri, et al., "Characterization of a Novel Hybrid Silicon Three-axial Force Sensor", Retrieved at <<http://web1.sssup.it/pubblicazioni/ugov_files/300696_2005_4195.pdf>>, Sensors and Actuators A, 2005, pp. 249-257.

Missinne, et al., "Embedded Flexible Optical Shear Sensor", Retrieved at <<https://biblio.ugent.be/input/download?func=downloadFile&fileOld=1058217&recordOld=1058211>>, Proceedings IEEE Sensors, Nov. 1-4, 2010, pp. 987-990.

Lincoln, et al., "An Optical 3D Force Sensor for Biomedical Devices", First IEEE/RAS-EMBS International Conference on Biomedical Robotics and Biomechatronics, 2012, pp. 1-6.

* cited by examiner

OPTICAL BASED TACTILE SHEAR AND NORMAL LOAD SENSOR

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Tactile sensors have conventionally been used for many applications; examples of such applications include robotic hands and skins, as well as biomedical sensing at human/machine interfaces (e.g., in prosthetic sockets). Various types of tactile sensors have conventionally been employed for these various applications. Examples of such tactile sensors include force sensitive resistors, capacitive sensors, optical sensors and MEMS sensors.

Many conventional tactile sensors can sense normal loads while being unable to sense shear loads. A normal load is a load perpendicular to a sensing surface. A shear load is a load parallel to the sensing surface. However, for many applications, it may be desirable to sense both normal loads and shear loads. For instance, in a robotic hand, shear load information can be used to enhance object manipulation and tactile exploration. Shear load information also has been seen to be important in monitoring prosthetic socket interface loads.

Some conventional approaches for multi-axis sensing are based on use of traditional strain gauge-based load cells, which are oftentimes large and expensive. Other conventional approaches for multi-axis sensing for tactile sensors use capacitive sensors, MEMS sensors, or optical sensors. For instance, a capacitive sensor can infer shear information of overlapping conductors through a dielectric. A MEMS sensor can include small cantilevers with piezo-resistive traces embedded in an elastomer; these sensors oftentimes have relatively small load capacity and are commonly frail. Conventional optical shear sensors oftentimes include a mechanical separation between an emitter and a photodiode so that the two are displaced relative to one another by shear loads. However, conventional optical shear sensors are unable to sense normal loads and typically are unable to differentiate between shear loads on differing axes.

SUMMARY

Described herein are various technologies that pertain to a tactile sensor that senses normal load and/or shear load. The tactile sensor includes a first layer and an optically transparent layer bonded together. At least a portion of the first layer is made of optically reflective material. The optically transparent layer is made of resilient material (e.g., clear silicone rubber). The tactile sensor includes light emitter/light detector pair(s), which respectively detect either normal load or shear load. Light emitter(s) emit light that traverses through the optically transparent layer and reflects off optically reflective material of the first layer, and light detector(s) detect and measure intensity of reflected light. When a normal load is applied, the optically transparent layer compresses, causing a change in reflected light intensity. When shear load is applied, a boundary between optically reflective material and optically absorptive material is laterally displaced, causing a change in reflected light intensity.

According to various embodiments, a tactile sensor can sense a normal load applied from an external source. The tactile sensor can include an optically reflective layer (e.g., which can be part of a first layer) bonded to an optically transparent layer. Further, the tactile sensor can include a light emitter/light detector pair. The light emitter can emit light that traverses through the optically transparent layer and reflects off of the optically reflective layer. Further, the light detector can detect the reflected light and measure an intensity of such reflected light. The intensity of the reflected light can change due to compression of the optically transparent layer; thus, the normal load applied to a top surface of the optically reflective layer can cause the optically transparent layer to compress, which leads to the change in the intensity of the reflected light.

In accordance with various embodiments, a tactile sensor can sense a shear load applied from an external source. The tactile sensor can include a first layer that includes an optically reflective region, an optically absorptive region, and a boundary between the optically reflective region and the optically absorptive region. Moreover, the tactile sensor includes an optically transparent layer bonded to the first layer. The tactile sensor can also include a light emitter/light detector pair positioned below the boundary. The light emitter can emit light that traverses through the optically transparent layer and reflects off the optically reflective region and is absorbed by the optically absorptive region. The light detector can detect the reflected light and measure an intensity of such reflected light. The intensity of the reflected light can change due to the boundary being laterally displaced relative to the light emitter/light detector pair. Accordingly, the shear load applied to a top surface of the first layer can cause the boundary to be laterally displaced, which leads to the change in intensity of the reflected light.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
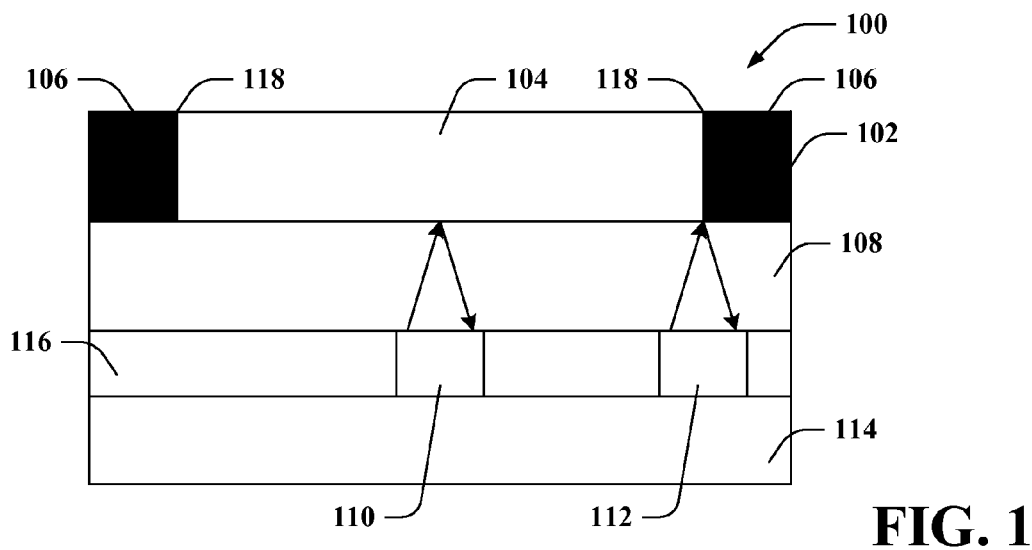
FIG. 1 illustrates a cross-sectional view of an exemplary tactile sensor that senses a normal load and a shear load as applied from an external source.

Various technologies pertaining to optical based tactile sensors that can sense normal and/or shear loads are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a cross-sectional view of an exemplary tactile sensor 100 that senses a normal load and a shear load as applied from an external source. The tactile sensor 100 includes a first layer 102 having a first top surface and a first bottom surface. The first layer 102 is an opaque layer. The first layer 102 includes an optically reflective region 104 and an optically absorptive region 106. Further, the first layer 102 includes a boundary 118 between the optically reflective region 104 and the optically absorptive region 106.

According to an example, the first layer 102 can be made of a resilient material. An example of such a resilient material is silicone rubber. Following this example where the first layer 102 is made of silicone rubber, white dye can be added to the silicon rubber in the optically reflective region 104 of the first layer 102. Moreover, black dye can be added to the silicone rubber in the optically absorptive region 106 of the first layer 102. However, it is contemplated that the first layer 102 can be made of other types of resilient material, other types of dyes, pigments, etc. can be utilized for the optically reflective region 104 and the optically absorptive region 106, or the like. Further, in accordance with other examples, it is to be appreciated that the first layer 102 need not be resilient.

The tactile sensor 100 also includes an optically transparent layer 108 having a second top surface and a second bottom surface. The second top surface of the optically transparent layer 108 is bonded with the first bottom surface of the first layer 102. The optically transparent layer 108 is made of a resilient material. An example of the resilient material is clear silicone rubber; yet, it is to be appreciated that other types of clear, resilient material are intended to fall within the scope of the hereto appended claims.

The first layer 102 and the optically transparent layer 108 can be mechanically uniform throughout (e.g., uniform material properties). Accordingly, the tactile sensor 100 can provide uniform load sensitivity across the first top surface of the first layer 102.

By way of illustration, the first layer 102 can have a thickness on the order of 1 mm and the optically transparent layer 108 can have a thickness on the order of 1 mm. The thickness of the optically transparent layer 108 can correspond to sensitivity to normal loads (e.g., more sensitive when the optically transparent layer 108 is thinner). However, it is to be appreciated that differing thicknesses for the first layer 102 and/or the optically transparent layer 108 are intended to fall within the scope of the hereto appended claims.

Moreover, the tactile sensor 100 can include a plurality of light emitters and a plurality of light detectors. In particular, the tactile sensor 100 can include a plurality of light emitter/light detector pairs (referred to herein as "emitter/detector pairs"). Many of the examples set forth herein describe a light emitter and a light detector in an emitter/detector pair being included in the same sensor housing. It is contemplated, however, that these examples can be extended to a configuration where the light emitter and the light detector in an emitter/detector pair are adjacent each other in separate housings.

According to various examples, the light emitters described herein can be light emitting diodes (LEDs). According to another example, the light detectors set forth herein can be phototransistors. It is contemplated, however, that the claimed subject matter is not limited to the foregoing examples, as any type of light emitter and/or light detector is intended to fall within the scope of the hereto appended claims.

For instance, each emitter/detector pair can be a photomicrosensor. A photomicrosensor can include both an infrared LED and a phototransistor included within a common package (e.g., common sensor housing). By way of illustration, the photomicrosensor can have a size of approximately 3.2 mm×1.7 mm×1.1 mm. Moreover, the photomicrosensor can provide a wide-angle detection field and can have a sensitivity that peaks at approximately 1 mm. Yet, the claimed subject matter is not limited to the foregoing illustration.

Figure 2:
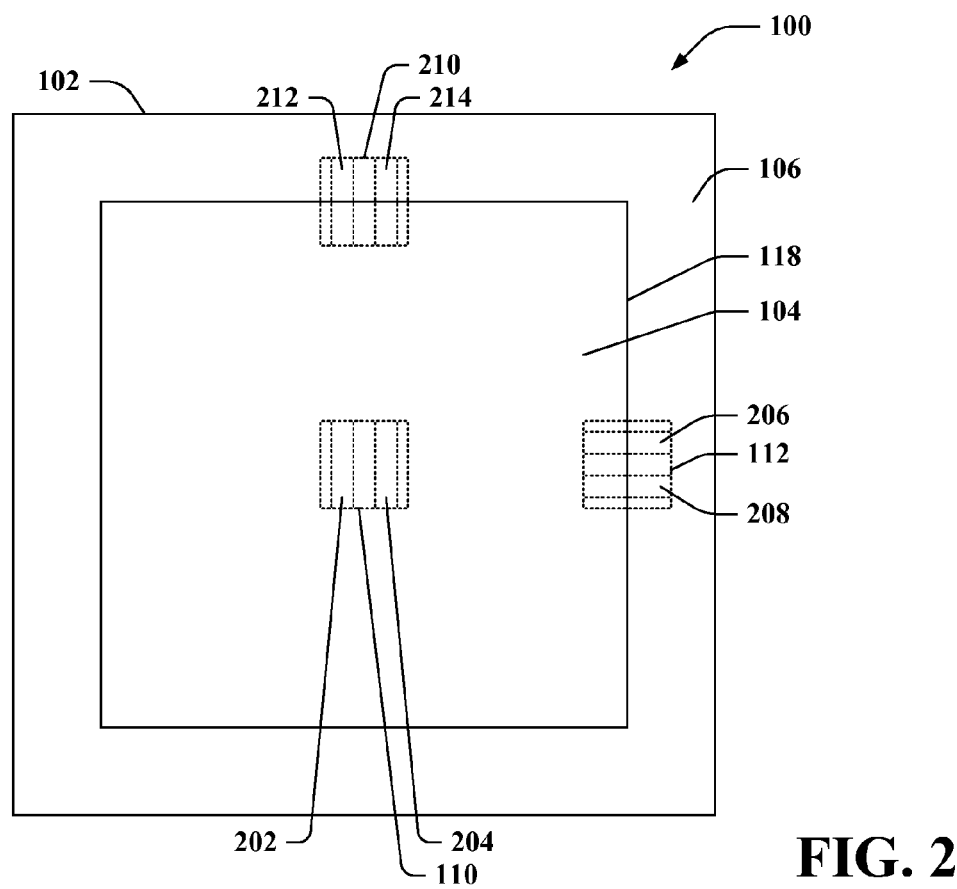
FIG. 2 illustrates a top view of the tactile sensor of FIG. 1.
Figure 11:
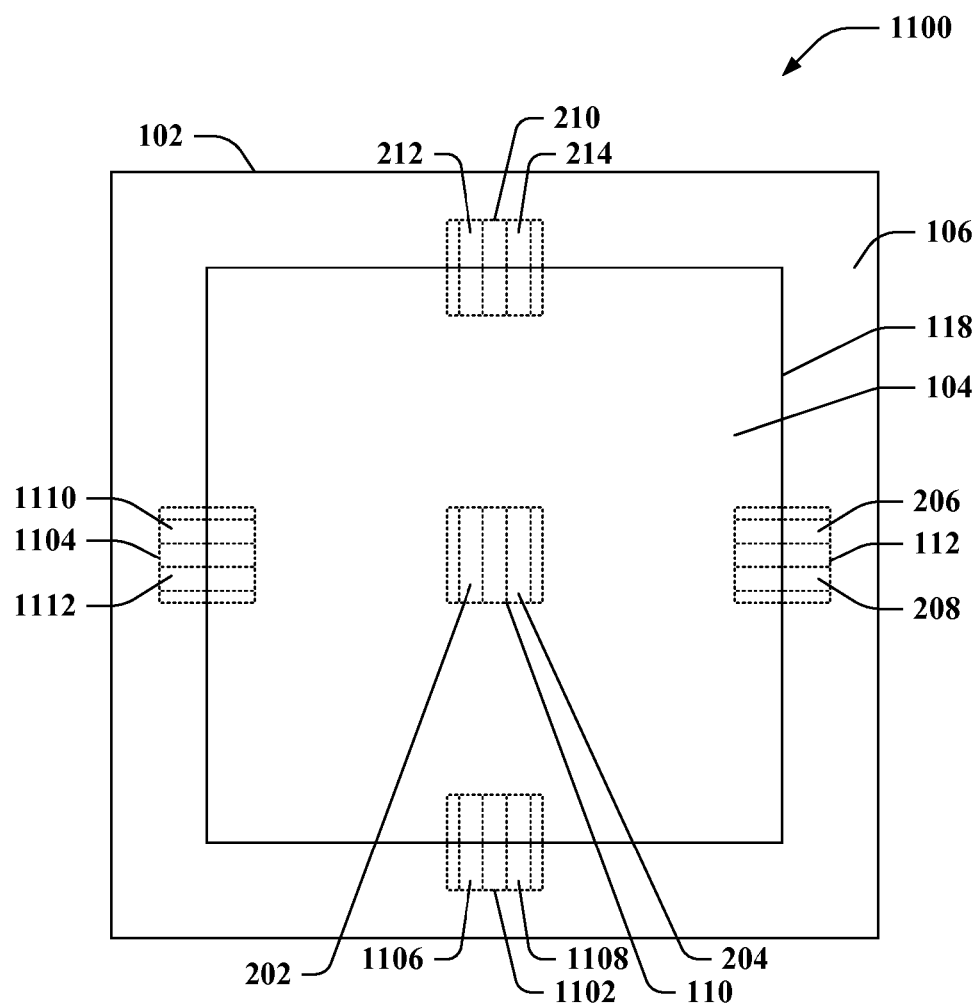
FIG. 11 illustrates a top view of another exemplary tactile sensor that includes five emitter/detector pairs for detecting normal and shear loads as applied to a top surface of a first layer from an external source.

As shown in FIG. 1, the tactile sensor 100 can include a first emitter/detector pair 110 and a second emitter/detector pair 112. The first emitter/detector pair 110 includes a first light emitter and a first light detector. The first light emitter and the first light detector of the first emitter/detector pair 110 are packaged within a first sensor housing. Moreover, the second emitter/detector pair 112 includes a second light emitter and a second light detector. The second light emitter and the second light detector of the second emitter/detector pair 112 are packaged within a second sensor housing. Although not depicted, it is contemplated that the tactile sensor 100 can include more than two emitter/detector pairs (e.g., as shown in FIG. 2 or 11 below).

The optically reflective region 104 of the first layer 102 can be centered above the first emitter/detector pair 110. Moreover, a side of the boundary 118 between the optically reflective region 104 and the optically absorptive region 106 of the first layer 102 can be positioned above the second emitter/detector pair 112. However it is to be appreciated that the claimed subject matter is not limited to the foregoing orientations.

The first emitter/detector pair 110 can detect the normal load applied to the first top surface of the first layer 102. For instance, the first light emitter of the first emitter/detector pair 110 can emit light that traverses through the optically transparent layer 108 towards the first layer 102. The optically reflective region 104 of the first layer 102 can reflect the light from the first light emitter incident thereupon as reflected light from the first light emitter. The reflected light from the first light emitter can traverse through the optically transparent layer 108 towards the second bottom surface of the optically transparent layer 108. Further, the first light detector of the first emitter/detector pair 110 can detect the reflected light from the first light emitter, and can measure a first intensity of the reflected light from the first light emitter.

According to an illustration, the optically transparent layer 108 can compress due to the normal load applied from the external source to the first top surface of the first layer 102. Following this illustration, the first intensity detected by the first light emitter of the first emitter/detector pair 110 can change due to compression of the optically transparent layer 108 since the optically reflective region 104 can be moved closer to the first emitter/detector pair 110 when the optically transparent layer 108 is compressed. Thus, the first intensity can be indicative of the normal load applied to the first top surface of the first layer 102.

The second emitter/detector pair 112 can detect the shear load applied to the first top surface of the first layer 102. For instance, the second light emitter of the second emitter/detector pair 112 can emit light that traverses through the optically transparent layer 108 towards the first layer 102. The optically reflective region 104 of the first layer 102 can reflect the light from the second light emitter incident thereupon as reflected light from the second light emitter. The reflected light from the second light emitter can traverse through the optically transparent layer 108 towards the second bottom surface of the optically transparent layer 108. Further, the second light detector of the second emitter/detector pair 112 can detect the reflected light from the second light emitter, and can measure a second intensity of the reflected light from the second light emitter.

As noted above, normal or shear loads applied to the first top surface of the first layer 102 can result in changes in reflected light detected by the light detectors. Accordingly, a load (e.g., normal and/or shear) can be detected at a location at which it is applied by measuring an electric signal outputted by the light detectors. For example, the light detectors can output currents, voltages, or the like corresponding to the respective measured intensities of the reflected light.

A side of the boundary 118 between the optically reflective region 104 and the optically absorptive region 106 can be laterally displaced relative to the second emitter/detector pair 112 (e.g., the second light emitter and the second light detector) from a position above the second emitter/detector pair 112 due to the shear load. Accordingly, the second intensity detected by the second light detector of the second emitter/detector pair 112 can change due to lateral displacement of the side of the boundary 118. Thus, the second intensity can be indicative of the shear load applied to the first top surface of the first layer 102.

The tactile sensor 100 can further include a circuit board 114. According to an example, the circuit board 114 can be a flexible circuit board; yet, it is contemplated that other types of circuit boards are intended to fall within the scope of the hereto appended claims. The first sensor housing of the first emitter/detector pair 110 and the second sensor housing of the second emitter/detector pair 112 can each be positioned on the circuit board 114 (as well as any additional sensor housing(s) for other emitter/detector pair(s)). Various other component(s) for controlling, analyzing signals from, etc. the emitter/detector pairs of the tactile sensor 100 can also be positioned on and/or integrated in the circuit board 114.

Further, the tactile sensor 100 can include an epoxy layer 116 having a top surface and a bottom surface. The top surface of the epoxy layer 116 can be bonded to the bottom surface of the optically transparent layer 108. For example, the epoxy layer 116 can be bonded to the optically transparent layer 108 with an adhesive or the like.

By way of example, the first emitter/detector pair 110 and the second emitter/detector pair 112 (as well as any additional emitter/detector pair(s)) can be arranged below the second bottom surface of the optically transparent layer 108. Following this example, the epoxy layer 116 can be cast up to a height of the first sensor housing and the second sensor housing (as well as any additional sensor housings of the tactile sensor 100). Thus, the epoxy layer 116 can provide a flat, smooth surface up to top surfaces of the first sensor housing and the second sensor housing. Accordingly, the optically transparent layer 108 can be built upon such smooth surface, thereby providing a uniform thickness of the optically transparent material (e.g., silicon rubber) across such surface. The epoxy layer 116, for instance, can be a rigid material adjacent to the first sensor housing and the second sensor housing so that rigid material around the sensors comes to the top surfaces of the first sensor housing and the second sensor housing. It is to be appreciated, however, that the claimed subject matter is not limited to the foregoing example.

Turning to FIG. 2, illustrated is a top view of the tactile sensor 100. As illustrated, the tactile sensor 100 includes the first emitter/detector pair 110 and the second emitter/detector pair 112. The first emitter/detector pair 110 includes a first light emitter 202 and a first light detector 204, and the second emitter/detector pair 112 includes a second light emitter 206 and a second light detector 208. Moreover, the tactile sensor 100 includes a third emitter/detector pair 210, which can be substantially similar to the first emitter/detector pair 110 and/or the second emitter/detector pair 112. The third emitter/detector pair 210 includes a third light emitter 212 and a third light detector 214.

Moreover, FIG. 2 shows a top view of the boundary 118 that separates the optically reflective region 104 and the optically absorptive region 106. As depicted, the boundary 118 has a square shape. According to an illustration, a length of a side of the square boundary can be on the order of 6 mm; yet, it is to be appreciated that other dimensions are intended to fall within the scope of the hereto appended claims. In accordance with yet another example, the boundary 118 can have a rectangular shape. Yet, it is further contemplated that other shapes for the boundary 118 are intended to fall within the scope of the hereto appended claims.

As noted above, a side (e.g., a first side) of the boundary 118 between the optically reflective region 104 and the optically absorptive region 106 of the first layer 102 can be positioned above the second emitter/detector pair 112. Further, a second side of the boundary 118 between the optically reflective region 104 and the optically absorptive region 106 of the first layer 102 can be positioned above the third emitter/detector pair 210. The first side of the boundary 118 positioned above the second emitter/detector pair 112 and the second side of the boundary 118 positioned above the third emitter/detector pair 210 can be adjacent and non-opposing.

Similar to the second emitter/detector pair 112, the third emitter/detector pair 210 can detect the shear load applied to the first top surface of the first layer 102. The third light emitter 212 of the third emitter/detector pair 210 can emit light that traverses through the optically transparent layer 108 towards the first layer 102. The optically reflective region 104 of the first layer 102 can reflect the light from the third light emitter 212 incident thereupon as reflected light from the third light emitter 212. The reflected light from the third light emitter 212 can traverse through the optically transparent layer 108 towards the second bottom surface of the optically transparent layer 108. The third light detector 214 of the third emitter/detector pair 210 can detect the reflected light from the third light emitter 212. Moreover, the third light detector 214 can measure a third intensity of the reflected light from the third light emitter 212.

When a shear load is applied to the top surface of the first layer 102, the second side of the boundary 118 between the optically reflective region 104 and the optically absorptive region 106 can be laterally displaced relative to the third emitter/detector pair 210 (e.g., third light emitter 212 and the third light detector 214) from the position above the third emitter/detector pair 210. Hence, the third intensity detected by the third light detector 214 of the reflected light from the third light emitter 212 can change due to lateral displacement of the second side of the boundary 118. The third intensity can be indicative of the shear load applied to the top surface of the first layer 102. According to an example, the second emitter/detector pair 112 can detect the shear load in a first direction, and the third emitter/detector pair 210 can detect the shear load in a second direction, where the first direction and the second direction can be orthogonal.

The tactile sensor 100 can be a three-axis optical sensor that can provide both normal and shear measurements. The tactile sensor 100 can include small, inexpensive, surface mounted integrated circuits with multiple layers (e.g., of silicon rubber) thereupon. According to various examples, the tactile sensor 100 can be suited for applications where a compliant material covers a rigid body. Examples of such applications include robot skins or prosthetic sockets. Yet, it is contemplated that the tactile sensor 100 can be utilized for substantially any other application.

Figure 3:
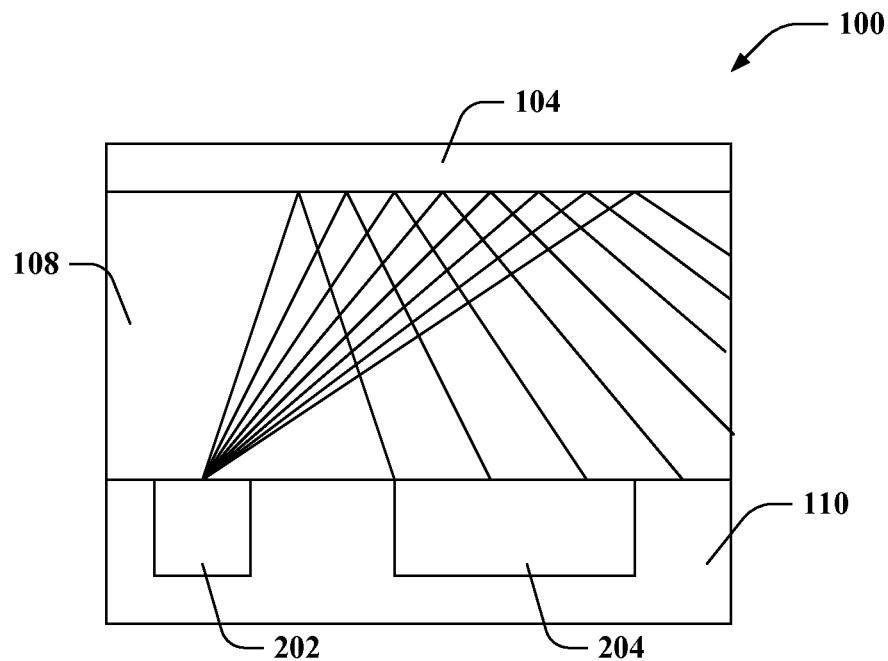
FIGS. 3-4 illustrate cross-sectional views of a portion of the tactile sensor of FIG. 1 under differing normal loading conditions.
Figure 4:
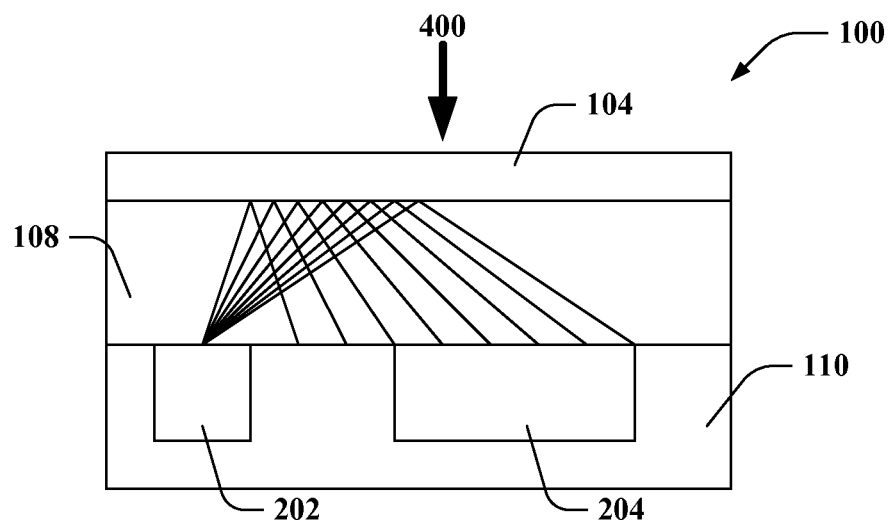

Turning to FIGS. 3-4, illustrated are cross-sectional views of a portion of the tactile sensor 100 under differing normal loading conditions. FIGS. 3-4 compare operation of the tactile sensor 100 when a normal load is and is not applied to a top surface of the optically reflective region 104 (e.g., of the first layer 102) above the first emitter/detector pair 110. It is to be appreciated, however, that the claimed subject matter is not limited to this example. Moreover, it is contemplated that the example shown in FIGS. 3-4 can be extended to a tactile sensor that includes an emitter/detector pair for detecting normal loads applied to such tactile sensor while lacking emitter/detector pair(s) for detecting shear loads applied to such sensor.

FIG. 3 depicts a scenario where a normal load is not applied to the top surface of the optically reflective region 104. The portion of the tactile sensor 100 depicted in FIG. 3 includes a portion of the optically reflective region 104, a portion of the optically transparent layer 108, and the first emitter/detector pair 110. The first emitter/detector pair 110 includes the light emitter 202 and the light detector 204. FIG. 3 shows the optically reflective region 104 (e.g., the first layer 102) being at a first position relative to the light emitter 202 and the light detector 204 when a normal load is not applied to the top surface of the optically reflective region 104. Moreover, FIG. 3 illustrates the reflection of light emitted by the first light emitter 202 off of the optically reflective region 104 under such scenario.

Now referring to FIG. 4, illustrated is a scenario where a normal load 400 is applied to the top surface of the optically reflective region 104 (e.g., the first layer 102) above the first emitter/detector pair 110. When the normal load 400 is applied to the top surface of the optically reflective region 104, the optically transparent layer 108 can be compressed. Thus, the reflective material of the optically reflective region 104 is moved closer to the light emitter 202 and the light detector 204, which causes the light detector 204 to detect an increase in reflective light from the light emitter 202. Thus, when comparing light intensity at the light detector 204, it is shown that intensity increases when the optically transparent layer 108 is compressed responsive to the normal load 400 applied to the top surface of the optically reflective region 104.

Accordingly, the tactile sensor 100 operates responsive to normal loads, such as the normal load 400, through compression of the height of the optically transparent layer 108 (and possibly the first layer 102). Thus, the reflective surface of the optically reflective region 104 can move closer to the light emitter 202, thereby increasing the intensity of light detected at the light detector 204. Further, reflected light intensity is used to detect proximity of the reflective material (e.g., the optically reflective region 104).

Figure 5:
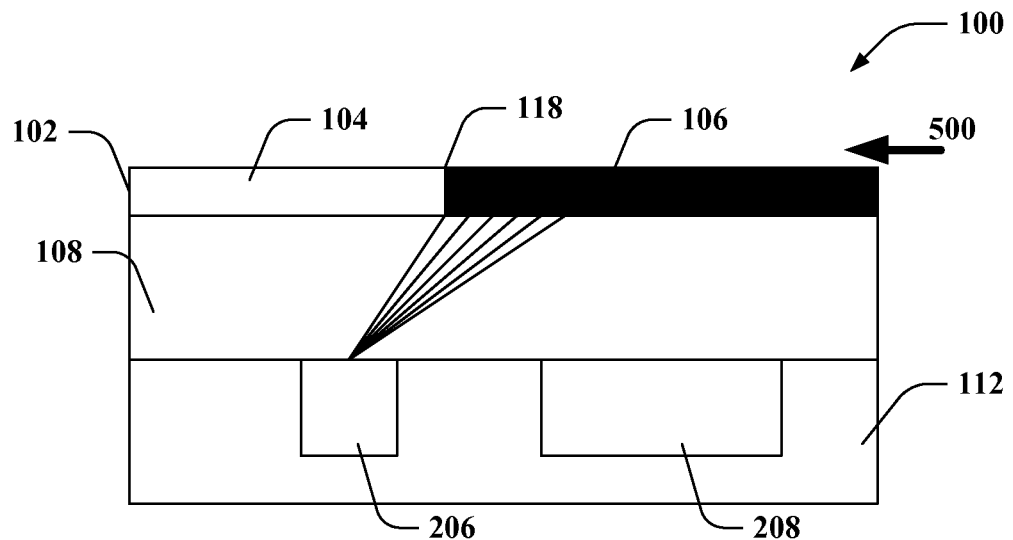
FIGS. 5-6 illustrate cross-sectional views of another exemplary portion of the tactile sensor of FIG. 1 under various shear loading conditions.
Figure 6:
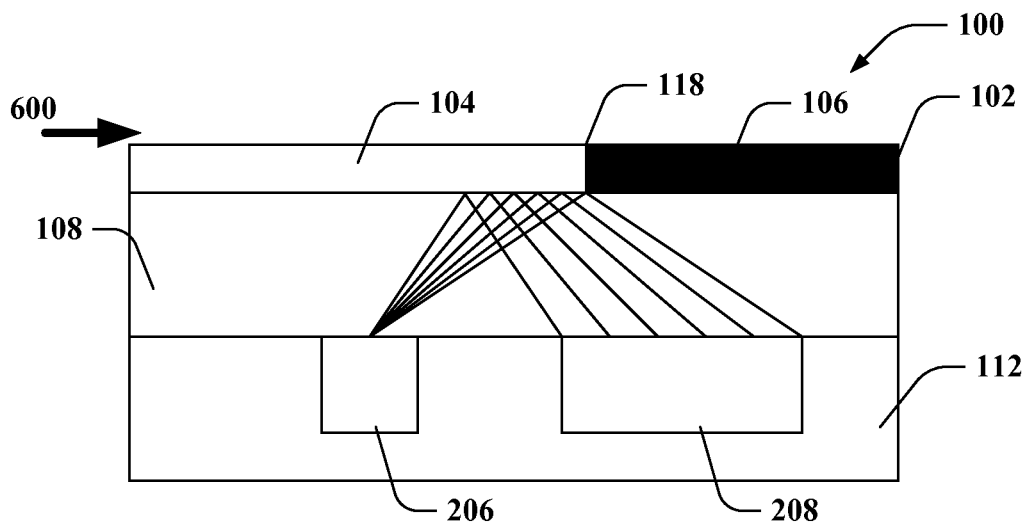

Turning to FIGS. 5-6, illustrated are cross-sectional views of another exemplary portion of the tactile sensor 100 under various shear loading conditions. FIGS. 5-6 compare operation of the tactile sensor 100 when a shear load is applied to the top surface of the first layer 102 in a first direction and in a second direction that is opposite the first direction. It is to be appreciated, however, that the claimed subject matter is not limited to the depicted example shown in FIGS. 5-6. Further, it is contemplated that the example shown in FIGS. 5-6 can be extended to a tactile sensor that includes emitter/detector pair(s) for detecting shear loads applied to such tactile sensor while lacking emitter/detector pair(s) for detecting normal loads applied to such sensor.

The portion of the tactile sensor 100 illustrated in FIGS. 5-6 includes a portion of the first layer 102. The first layer 102 includes the optically reflective region 104 and the optically absorptive region 106, separated by the boundary 118. Moreover, the portion of the tactile sensor 100 depicted in FIGS. 5-6 includes a portion of the optically transparent layer 108. Further, the portion of the tactile sensor 100 shown in FIGS. 5-6 includes the second emitter/detector pair 112, which includes the second light emitter 206 and the second light detector 208. Although not shown, it is to be appreciated that the example shown in FIGS. 5-6 can be applicable to the third emitter/detector pair 210, which further includes the third light emitter 212 and the third light detector 214.

Referring to FIG. 5, a shear load 500 is applied to the top surface of the first layer 102. The shear load 500 causes the first layer 102 to shift in a leftwards direction. Thus, the shear load 500 causes the boundary 118 to be laterally displaced relative to the second light emitter 206 and the second light detector 208. More particularly, such lateral displacement increases a ratio of absorptive to reflective material between the second light emitter 206 and the second light detector 208. Thus, light emitted by the second light emitter 206 is absorbed by the optically absorptive region 106, leading to light not being reflected back through the optically transparent layer 108 to the second light detector 208.

Now turning to FIG. 6, a disparate shear load 600 is applied to the top surface of the first layer 102. The shear load 600 causes the first layer 102 to shift in a rightwards direction. Thus, the shear load 600 causes the boundary 118 to be laterally displaced relative to the second light emitter 206 and the second light detector 208. More particularly, the shear load 600 causes a ratio of absorptive to reflective material between the second light emitter 206 and the second light detector 208 to be decreased. Hence, light emitted by the second light emitter 206 is reflected by the optically reflective region 104, leading to an increased intensity of light that traverses back through the optically transparent layer 108 and is detected by the second light detector 208.

Accordingly, shear loads can be sensed by adding absorptive regions to the reflective layer. Shear loads can move the absorptive portion of the first layer 102 relative to the second light emitter 206, thereby changing an intensity of the reflected light received at the second light detector 208. Thus, an applied shear load can change the ratio of absorptive to reflective material between the second light emitter 206 and the second light detector 208. The changes in the amount of light reflected back to the light detector 208 can accordingly be determined.

Figure 7:
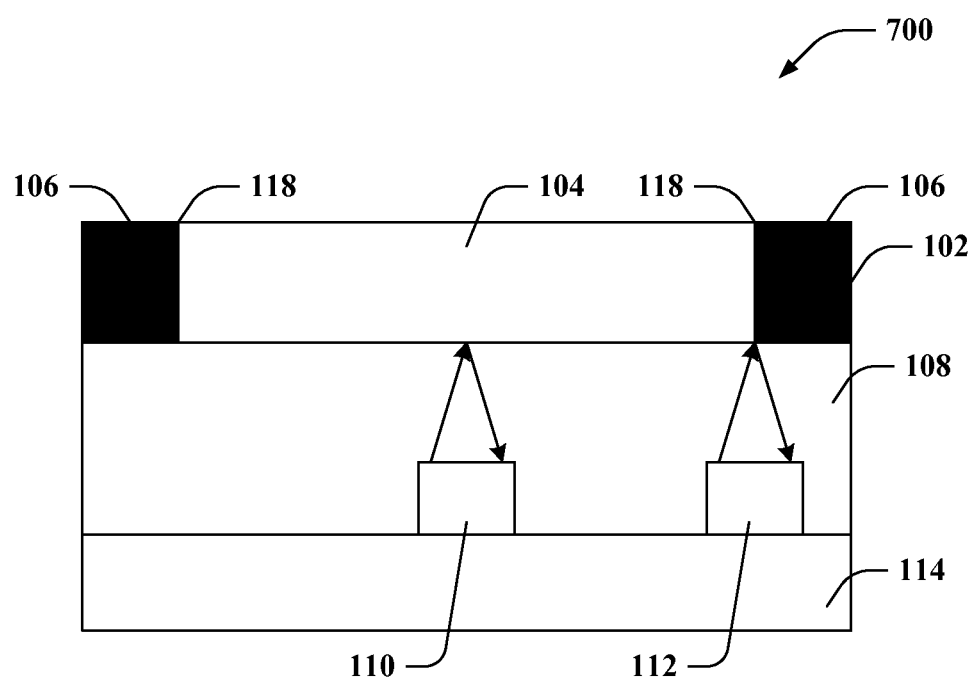
FIG. 7 illustrates a cross-sectional view of another exemplary tactile sensor.

With reference to FIG. 7, illustrated is a cross-sectional view of another exemplary tactile sensor 700. The tactile sensor 700 includes the first layer 102, the optically transparent layer 108, and the circuit board 114. The first layer 102 can further include the optically reflective region 104, the optically absorptive region 106, and the boundary 118 between the optically reflective region 104 and the optically absorptive region 106. Moreover, the tactile sensor 700 can include the first emitter/detector pair 110 and the second emitter/detector pair 112 (as well as the third emitter/detector pair 210).

The first sensor housing of the first emitter/detector pair 110 and the second sensor housing of the second emitter/detector pair 112 (as well as other sensor housing(s)) can be positioned upon the circuit board 114. In contrast to the tactile sensor 100 of FIG. 1 where the sensor housings are arranged below the bottom surface of the optically transparent layer 108 in an epoxy layer, the tactile sensor 700 of FIG. 7 can lack such epoxy layer. Rather, the first and second sensor housings can be arranged within the optically transparent layer 108. Moreover, other tactile sensors set forth herein as including an epoxy layer can similarly lack such epoxy layer in various embodiments. It is to be appreciated, however, that the claimed subject matter is not so limited.

Figure 8:
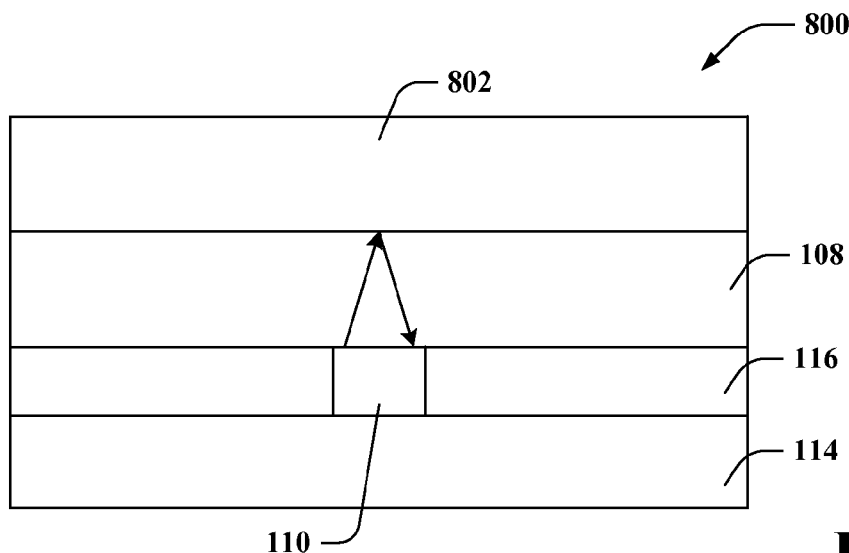
FIG. 8 illustrates a cross-sectional view of an exemplary tactile sensor that senses normal load as applied from an external source.

Turning to FIG. 8, illustrated is a cross-sectional view of an exemplary tactile sensor 800 that senses normal load as applied from an external source. The tactile sensor 800 includes an optically reflective layer 802 having a first top surface and a first bottom surface. The optically reflective layer 802 can be substantially similar to the optically reflective region 104 of the first layer 102 as described above. Further, the tactile sensor 800 need not include optically absorptive material.

The tactile sensor 800 further includes the optically transparent layer 108 having the second top surface and the second bottom surface. The second top surface of the optically transparent layer 108 is bonded with the first bottom surface of the optically reflective layer 802. The tactile sensor 800 further includes the first emitter/detector pair 110. The tactile sensor 800 can also include the circuit board 114 and the epoxy layer 116; yet, the claimed subject matter is not so limited.

As compared to the tactile sensor 100 of FIG. 1, the tactile sensor 800 of FIG. 8 includes an emitter/detector pair (e.g., the first emitter/detector pair 110) used to sense a normal load applied to the first top surface of the optically reflective layer 802. Further, the tactile sensor 800 can lack emitter/detector pair(s) for detecting a shear load applied to the first top surface of the optically reflective layer 802.

Figure 9:
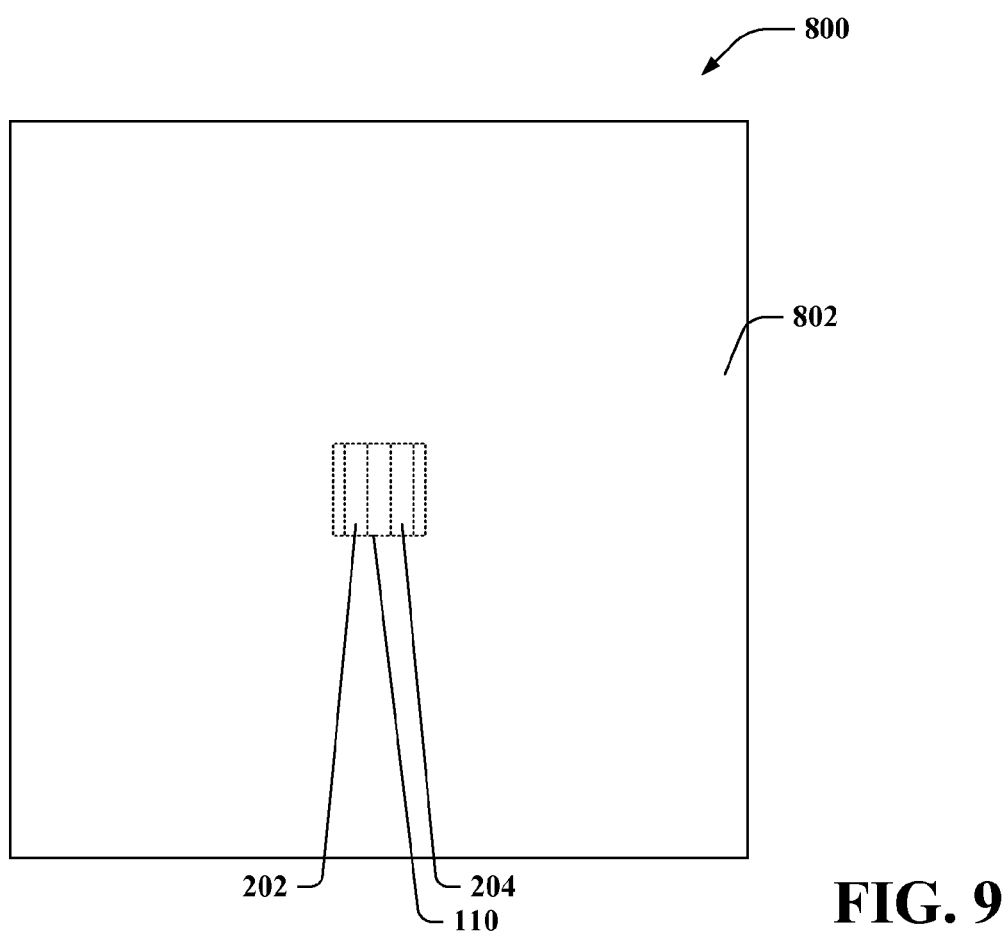
FIG. 9 illustrates a top view of the tactile sensor of FIG. 8.

Now referring to FIG. 9, illustrated is a top view of the tactile sensor 800. As shown, the tactile sensor 800 includes the first emitter/detector pair 110. The first emitter/detector pair 110 further comprises the first light emitter 202 and the first light detector 204.

Figure 10:
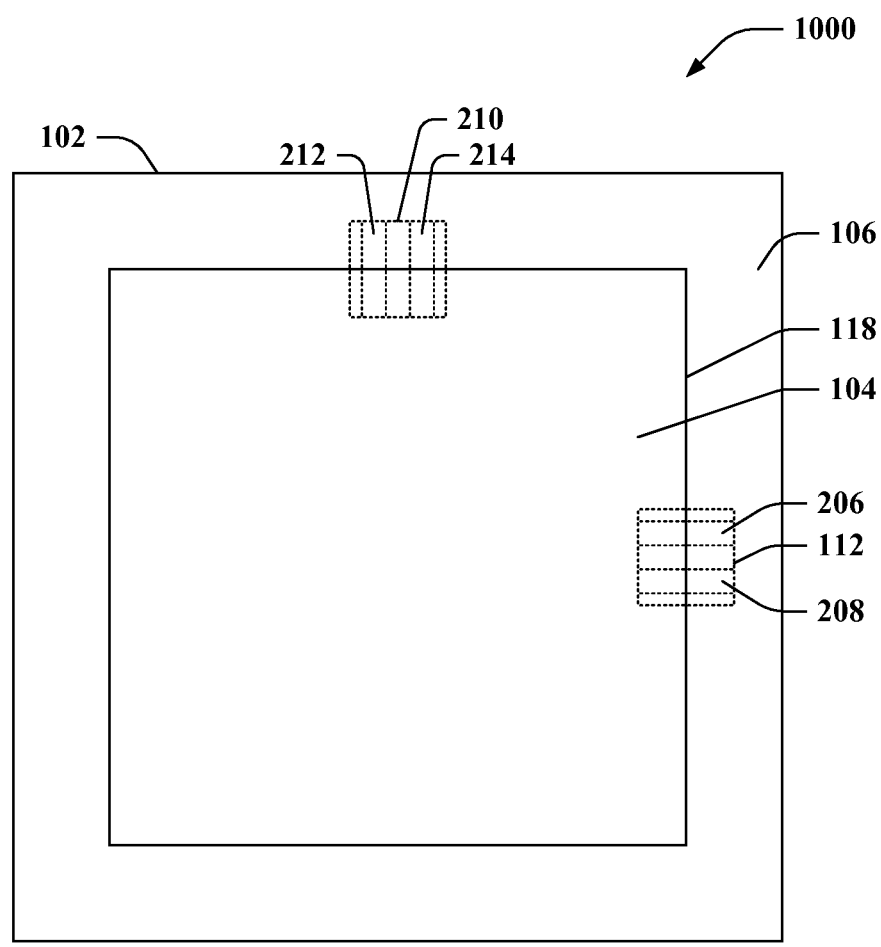
FIG. 10 illustrates a top view of another exemplary tactile sensor that senses a shear load as applied from an external source.

With reference to FIG. 10, illustrated is a top view of another exemplary tactile sensor 1000 that senses a shear load as applied from an external source. The tactile sensor 1000 includes the first layer 102 having the first top surface and the first bottom surface. The first layer 102 includes the optically reflective region 104, the optically absorptive region 106, and the boundary 118 between the optically reflective region 104 and the optically absorptive region 106. The tactile sensor 1000 further comprises the optically transparent layer 108 (although not shown).

As depicted, the tactile sensor 1000 includes the second emitter/detector pair 112 and the third emitter/detector pair 210. The second emitter/detector pair 112 includes the second light emitter 206 and the second light detector 208. The third emitter/detector pair 210 includes the third light emitter 212 and the third light detector 214.

The tactile sensor 1000 can detect a shear load applied to a top surface of the first layer 102. In contrast to the tactile sensor 100 of FIG. 1, the tactile sensor 1000 lacks emitter/detector pair(s) for detecting a normal load applied to the top surface of the first layer 102.

Now referring to FIG. 11, illustrated is a top view of another exemplary tactile sensor 1100 that includes five emitter/detector pairs for detecting normal and shear loads as applied to a top surface of the first layer 102 from an external source. Again, the first layer 102 has the first top surface and the first bottom surface, and includes the optically reflective region 104, the optically absorptive region 106, and the boundary 118 there between. Moreover, the tactile sensor 1100 includes the first emitter/detector pair 110 (e.g., including the first light emitter 202 and the first light detector 204) utilized to sense the normal load applied to the top surface of the first layer 102.

The tactile sensor 1100 also includes four emitter/detector pairs for detecting shear loads as applied to the top surface of the first layer 102. More particularly, the emitter/detector pair 210 and an emitter/detector pair 1102 (e.g., including a light emitter 1106 and a light detector 1108) can be utilized for detecting shear load in a first direction. Further, the emitter/detector pair 112 and an emitter/detector pair 1104 (e.g., including a light emitter 1110 and a light detector 1112) can be utilized for detecting shear load in a second direction, which is orthogonal to the first direction. Accordingly, the tactile sensor 1100 is a three-axis sensor that includes five emitter/detector pairs: one of the emitter/detector pairs detects normal loads, two of the emitter/detector pairs detect shear in one direction, and two of the emitter/detector pairs detect shear in an orthogonal direction.

Figure 12:
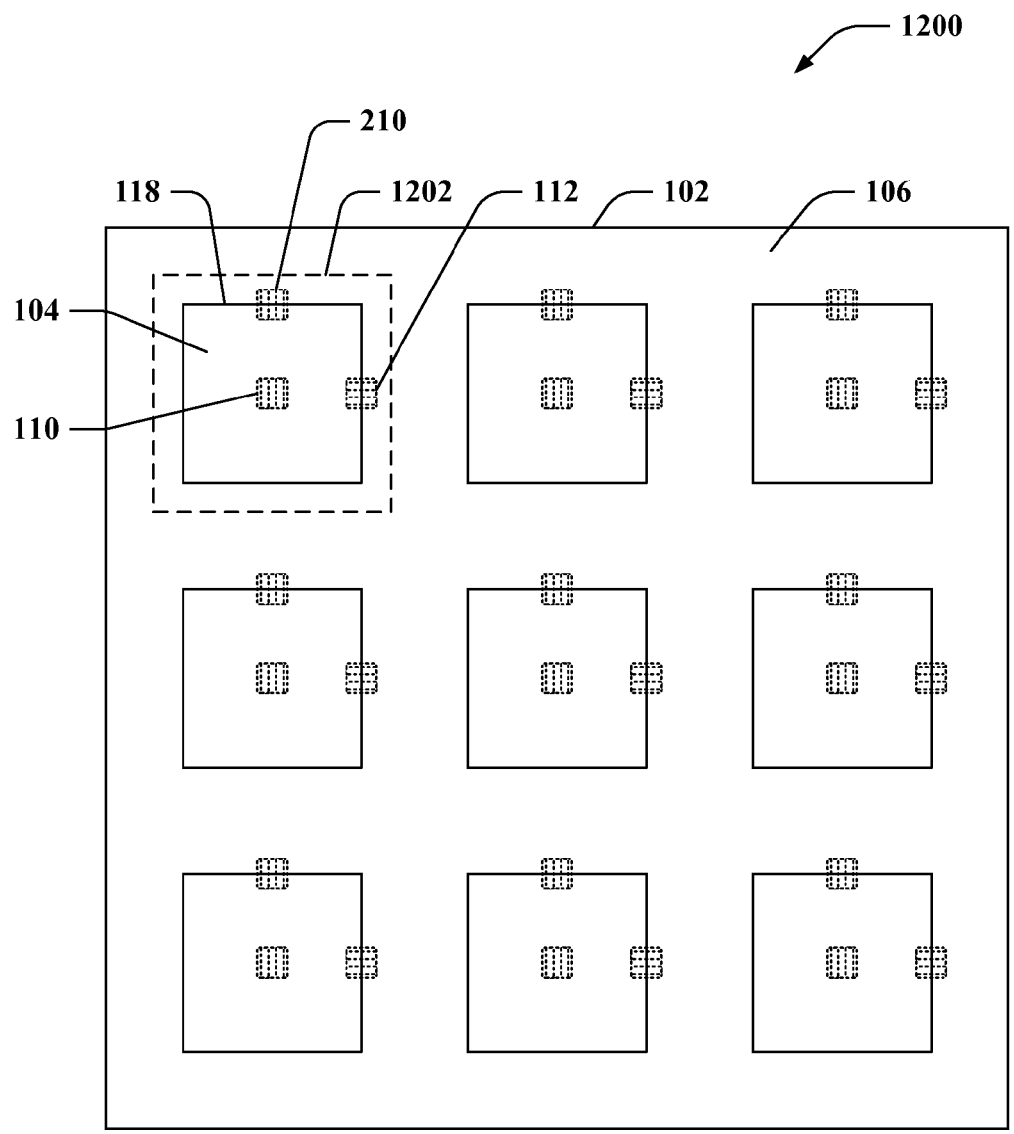
FIG. 12 illustrates a top view of another exemplary tactile sensor that includes a plurality of taxels.

With reference to FIG. 12, illustrated is a top view of another exemplary tactile sensor 1200 that includes a plurality of taxels. A taxel is a tactile pixel. A taxel provides information about a plurality of degrees of freedom. Because each emitter/detector pair provides information about a single degree of freedom, a taxel can provide three axes of information. Accordingly, each taxel of the tactile sensor 1200 can include three emitter/detector pairs for providing such information.

For instance, a taxel 1202 can include the first emitter/detector pair 110, the second emitter/detector pair 112, and the third emitter/detector pair 210. Moreover, the taxel 1202 can include the boundary 118 between the optically reflective region 104 and the optically absorptive region 106 of the first layer 102 as well as the optically reflective region 104 of the first layer 102. According to an example, the taxel 1202 can include the first light emitter, the second light emitter, the third light emitter, the first light detector, the second light detector, the third light detector, the optically reflective region 104, and the boundary 118 between the optically reflective region 104 and the optically absorptive region 106. A second taxel in the tactile sensor 1200 can include a fourth light emitter, a fifth light emitter, a sixth light emitter, a fourth light detector, a fifth light detector, a sixth light detector, a second optically reflective region, and a second boundary between the second optically reflective region and the optically absorptive region 106. Moreover, the tactile sensor 1200 can include more taxels substantially similar to the above noted first and second taxels. As depicted, the exemplary tactile sensor 1200 includes nine taxels. It is to be appreciated, however, that a tactile sensor with substantially any number of taxels is intended to fall within the scope of the hereto appended claims.

Deduction of a direction and magnitude of applied loads can be determined if directional sensitivities of the three axes are independent. However, it is to be appreciated that the claimed subject matter is not so limited.

By way of other examples, it is contemplated that more than three emitter/detector pairs can be included in each taxel (e.g., as set forth in FIG. 11). According to another example, a taxel can include less than three emitter/detector pairs (e.g., the taxel can provide less than three axes of information).

Further, as used herein, the term "exemplary" is intended to mean "serving as an illustration or example of something."

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A tactile sensor that senses a normal load and a shear load as applied from an external source, the sensor comprising:
   a first layer having a first top surface and a first bottom surface, wherein the first layer comprises an optically reflective region, an optically absorptive region, and a boundary between the optically reflective region and the optically absorptive region;
   an optically transparent layer having a second top surface and a second bottom surface, wherein the second top surface of the optically transparent layer is bonded with the first bottom surface of the first layer;
   a first light emitter;
   a second light emitter;
   a first light detector; and
   a second light detector;
   wherein the optically transparent layer compresses due to the normal load;
   wherein the optically reflective region of the first layer is centered above the first light emitter and the first light detector;
   wherein a side of the boundary between the optically reflective region and the optically absorptive region is laterally displaced relative to the second light emitter and the second light detector from a position above the second light emitter and the second light detector due to the shear load;
   wherein the first light emitter emits light that traverses through the optically transparent layer towards the first layer, the optically reflective region of the first layer reflects the light from the first light emitter incident thereupon as reflected light from the first light emitter, the reflected light from the first light emitter traverses through the optically transparent layer towards the second bottom surface, and the first light detector detects the reflected light from the first light emitter and measures a first intensity of the reflected light from the first light emitter;
   wherein the first intensity changes due to compression of the optically transparent layer and the first intensity is indicative of the normal load applied to the first top surface of the first layer;
   wherein the second light emitter emits light that traverses through the optically transparent layer towards the first layer, the optically reflective region of the first layer reflects the light from the second light emitter incident thereupon as reflected light from the second light emitter, the reflected light from the second light emitter traverses through the optically transparent layer towards the second bottom surface, and the second light detector detects the reflected light from the second light detector and measures a second intensity of the reflected light from the second light emitter; and
   wherein the second intensity changes due to lateral displacement of the side of the boundary and the second intensity is indicative of the shear load applied to the first top surface of the first layer.

2. The tactile sensor of claim 1, further comprising:
   a third light emitter; and
   a third light detector;
   wherein a second side of the boundary between the optically reflective region and the optically absorptive region is laterally displaced relative to the third light emitter and the third light detector from a second position above the third light emitter and the third light detector due to the shear load, wherein the first side of the boundary and the second side of the boundary are adjacent and non-opposing;
   wherein the third light emitter emits light that traverses through the optically transparent layer towards the first layer, the optically reflective region of the first layer reflects the light from the third light emitter incident thereupon as reflected light from the third light emitter, the reflected light from the third light emitter traverses through the optically transparent layer towards the second bottom surface, and the third light detector detects the reflected light from the third light emitter and measures a third intensity of the reflected light from the third light emitter;
   wherein the third intensity of the reflected light from the third light emitter changes due to lateral displacement of the second side of the boundary and the third intensity is indicative of the shear load applied to the first top surface of the first layer; and
   wherein the second light emitter and the second light detector detect the shear load in a first direction and the third light emitter and the third light detector detect a shear load in a second direction, wherein the first direction and the second direction are orthogonal.

3. The tactile sensor of claim 2, further comprising:
   a first taxel that comprises the first light emitter, the second light emitter, the third light emitter, the first light detector, the second light detector, the third light detector, the optically reflective region, and the boundary between the optically reflective region and the optically absorptive region; and
   a second taxel that comprises a fourth light emitter, a fifth light emitter, a sixth light emitter, a fourth light detector, a fifth light detector, a sixth light detector, a second optically reflective region, and a second boundary between the second optically reflective region and the optically absorptive region.

4. The tactile sensor of claim 1, wherein the first layer is made of silicone rubber, white dye is added to the silicone rubber in the optically reflective region of the first layer, and black dye is added to the silicone rubber in the optically absorptive region of the first layer, and wherein the optically transparent layer is made of clear silicone rubber.

* * * * *